United States Patent [19]

Plaot

[11] Patent Number: 4,629,283
[45] Date of Patent: Dec. 16, 1986

[54] OPTICAL FLAT BED SCANNING SYSTEM

[75] Inventor: Michael Plaot, Eschborn, Fed. Rep. of Germany

[73] Assignee: Allied Corporation, Morris Township, Morris County, N.J.

[21] Appl. No.: 696,974

[22] Filed: Jan. 31, 1985

[30] Foreign Application Priority Data

Feb. 8, 1984 [DE] Fed. Rep. of Germany ....... 3404407

[51] Int. Cl.[4] ............................................. G02B 26/10
[52] U.S. Cl. ..................................................... 350/6.8
[58] Field of Search ................... 350/6.4, 6.5, 6.6, 6.7, 350/6.8

[56] References Cited

U.S. PATENT DOCUMENTS

| 3,469,030 | 9/1969 | Priebe. | |
|---|---|---|---|
| 4,002,830 | 1/1977 | Brown et al. | |
| 4,179,183 | 12/1979 | Tateoka et al. | 350/6.1 |
| 4,274,703 | 6/1981 | Fisli | 350/6.8 |
| 4,383,755 | 5/1983 | Fedder et al. | 350/6.8 |

FOREIGN PATENT DOCUMENTS

| 1154656 | 9/1963 | Fed. Rep. of Germany. |
| 2601327 | 8/1976 | Fed. Rep. of Germany. |
| 2911528 | 9/1979 | Fed. Rep. of Germany. |
| 2195801 | 3/1974 | France. |
| 2244185 | 4/1975 | France. |

OTHER PUBLICATIONS

Valtec, Precision Optical Division, May 1977.
Pat. Abstract of Japan 58-62615.

Primary Examiner—John K. Corbin
Assistant Examiner—Loha Ben
Attorney, Agent, or Firm—Anibal J. Cortina; William F. Thornton

[57] ABSTRACT

An optical flat bed scanning system, particularly useable in a typesetter, has an optical device to linearize beam deflection positions in a planar deflection plane with essentially two elements. The optical device comprises an aplanatic unit lens with an approximately planar surface and a spherically convex surface and a field flattening mirror with a spherical reflecting surface.

6 Claims, 1 Drawing Figure

OPTICAL FLAT BED SCANNING SYSTEM

BACKGROUND OF INVENTION

The invention relates to an opto mechanical deflector with at least one rotating or slewing scan mirror element which is hit by a substantially parallel beam which is focused onto a flat image plane with a concave mirror near the flat image plane.

Such known deflectors can be used for various applications of flat bed scanning systems as input scanner or output scanners. One typical application is the scanning of a web of material in the deflection plane to inspect it for faults.

In the case at hand, one preferred application of the optical flat bed scanning system is the setting of typographic characters by means of a beam of light, in particular of a laser light source, modulated with a pixel frequency according to picture elements.

Generally, such optical flat bed scanning systems are to move a beam of light rays fixed in space in the direction of a scanning line across a planar deflection plane and, if at all possible, in such a manner that, normally, a deflection path increment of equal length corresponds to each pixel period, regardless of the location of the increment in the scanning line. In the optical flat bed scanning system of the kind mentioned at the outset, with a turnable or pivotable, reflecting surface, this includes also that a proportional distance in the deflection plane corresponds to each angle of rotation of this surface. In addition, the distances between consecutive scanning lines should be constant. This relation is restricted because of a number of possible errors referring among others, to the limited manufacturing accuracy of such flat bed scanning systems. In particular, the so-called wobble of the bearing in which the turnable or pivotable reflecting surface is mounted and the so-called polygon pyramidal error in the case of a polygon composed of several, mutually offset surfaces can disturb the relation of consecutive scanning lines (the polygon pyramidal error means that angular variation of a reflecting polygon surface each relative to a reference surface.)

In order to deflect scanning lines in a planar deflecting plane exactly despite such disturbing influences, which is especially desirable particularly in typographical applications because even the slightest irregularities are conspicuously disturbing there, it is self-suggesting to aspire to as large a deflection angle as possible. For, at a given deflection length, the optically effective distance or arm between the turnable image plane and the deflection plane can be correspondingly reduced by a greater deflection angle. This causes inaccuracies of motion and position of the reflecting surface, such as of a polygon, to have a lesser effect in the deflection plane.

In typical, known, optical flat bed scanning systems, the optic device to deflect a beam of light rays in deflection positions of the deflection plane essentially proportional to a deflection angle of the turnable reflecting surface, which optic is disposed between the turnable reflecting surface and the deflection plane, consists of flat field lenses in an arrangement of many members which is correspondingly expensive. These lenses are also called $f\theta$ lenses. But it is a disadvantage of such $f\theta$ lenses that they can be used only in a limited range of the deflection angle, especially when the resolution requirements are high as in a typesetter.

SUMMARY OF THE INVENTION

It is an object of the present invention to further develop an opto mechanical deflector the kind mentioned at the outset so that for a given resolution and line length the angle of deflection is increased while the manufacturing costs for the optic device are reduced, i.e. that the optical lever to the image plane is shortened correspondingly.

This problem is solved by the herein described optical flat bed scanning system.

According to the invention, only three optically active surfaces are required in a very simple optically system between the turnable or pivotable mirror, in particular a polygon, and the deflection plane. One surface belongs to the field flattening mirror which is disposed as near the deflection plane as possible and only so far away from it as is indispensable for mechanical reasons. The two other planes are formed by the aplanatic unit lens between the turnable or pivotable, reflecting surface, in particular a polygon, and the field flattening mirror. Of them, the first surface, of planar design or with a very large radius of curvature and directed at the turnable or reflecting surface, decreases the deflection angle by refraction. This makes it possible to increase the active range of the deflection angle by more than 30%. This means that the duty ratio is greater. (The definition of the duty ratio is the time difference to sweep the scanning line lengths with one facet less the not utilizable dead time during the transition of two facets, relative to the scanning line length sweep time of one facet). This relatively great duty ratio is again advantageous because it makes it possible to reduce the pixel frequency (picture element frequency) for a given setting speed in a typesetter. This leads to a simplification and a more economical production of the electronic typesetter components generating the picture element frequency. On the other hand, if the type is set with a given picture element frequency and resolution, the optical flat bed system according to the invention makes possible a higher output speed of the characters set. The third and last optically active surface, representing the second spherically convex surface of the aplanatic lens facing the deflection plane, effects the principal focusing of a beam of rays in the deflection plane. For the main case of application of the typesetter, this second, spherically convex surface is, therefore, also called output surface, whereas the first, planar surface of the unit lens represents its input surface. For the only focusing surface, the output surface, the unavoidable, spherical aberration is relatively small and can, moreover, be precorrected at relatively low cost.

It must yet be noted in regard to the aplanatic unit lens that the high duty ratio and the good utilization of the active deflection time are not impaired by additional elements disposed in the path of rays to the image plane.

The condition that the single lens is aplanatic leads to the relatively great glass thickness of this lens and to the spacing between its first planar surface.

The first, approximately planar surface of the aplanatic unit lens facing the turnable or pivotable surface need not be absolutely flat. It suffices for the radius of curvature of this approximately planar surface to be great in relation to the radius of curvature of the second, spherically convex surface facing the scanning plane, wherefrom result relatively weak refractive powers of the approximately planar surface.

In particular, the design of an aplanatic unit lens with a ratio of at least 5 to 1 between the curvature radius of its first or approximately planar surface and the second or spherically convex surface results in low distortion in the image plane without costly additional correction and has proven to be advantageous for the application of the optical flat bed scanning system to a typesetter.

Further, the field flattening mirror near the image plane is preferably designed with a spherical, reflecting surface.

As mentioned above, the reproduction error caused by the spherical aberration can be further reduced by a precorrection. According to the embodiment shown, the precorrection by a constant value is made along the entire usable scanning angle or scanning line length.

For compensation of the spherical aberration it is advantageous to use additional optical elements in the path of rays between the turnable or pivotable, reflecting surface and another plane (intermediate image plane) outside of the path of rays between the turnable, reflecting surface and the deflection plane.

For compact design of the optical flat bed scanning system according to the embodiment shown, there is provided, an additional deviation mirror with a planar, reflecting surface to separate the incident ray from the aplanatic unit lens and the ray reflected by the field flattening mirror.

Another advantageous compensation for the sagging of the image or scanning line due to oblique positioning of the field flattening mirror or of the pivoting axis of the reflecting surface is made by the amount of tilt of the turning or axis and of the field flattening mirror according to the geometry of the total scanning system.

BRIEF DESCRIPTION OF THE DRAWINGS

The invention is explained below with reference to a drawing with FIG. 1. It shows the simplified path of rays of the optical flat bed scanning system, which preferably is part of a comprehensive system of a typesetter.

DESCRIPTION OF THE PREFERRED EMBODIMENTS

Figure 1:
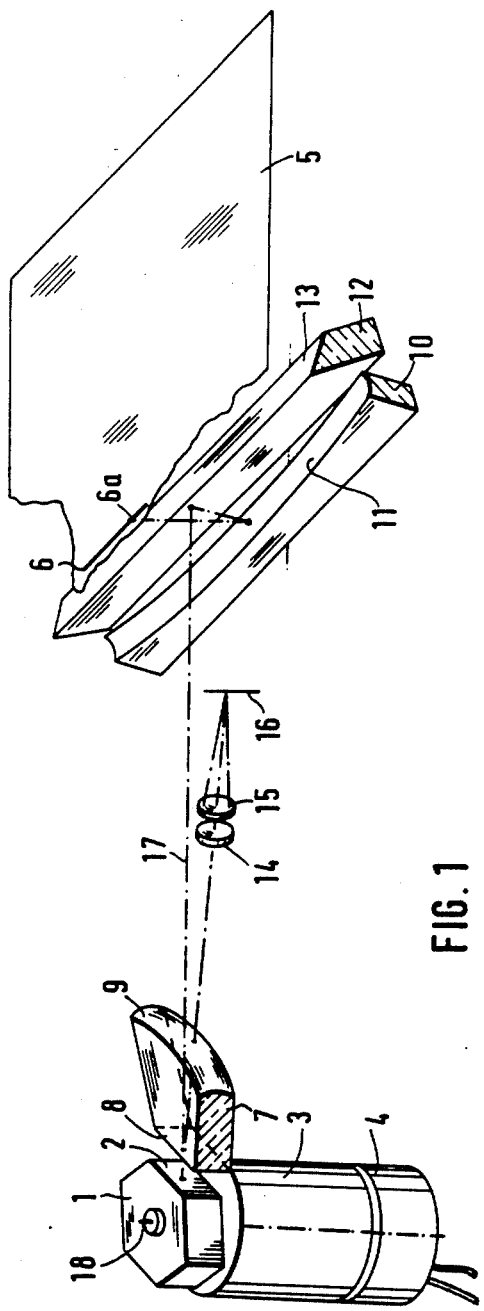

In FIG. 1, a polygon 1 with six turnable, reflecting surfaces mutually offset of 120° each forms part of the optical flat bed scanning system, the reflecting surface which happens to be effective in the position shown being marked 2.

To the extent that the aforementioned performance data of the flat bed scanning system according to the invention include number and kind of the turnable, reflecting surfaces, these data relate to the polygon per FIG. 1.

The polygon 1 is rotatably mounted in a bearing 3 and driven by a motor 4. The driving mode may be continuous or stepwise. The (imaginary) axis of rotation is marked 18.

In the path of rays between the polygon 1 and a planar deflection plane 5, which may be represented in a typesetter by a light-sensitive film plane, is disposed an optic device, made up of a combination of elements as discussed below to project a beam of rays falling on the turnable, reflecting surface onto the deflecting plane 5 and to linearize the relation between a deflection angle corresponding to the angle of rotation of the polygon and the position of the beam of rays projected into a scanning line 6.

This optic device comprises, near the polygon, an aplanatic single lens 7 with an approximately planar surface 8 facing the polygon and a second, spherically convex surface 9 facing the scanning plane.

This is followed, in the further course of the path of rays between the polygon and the deflection plane, by a field flattening mirror 10 with a spherical, reflecting surface 11. This spherical, reflecting surface is directed, on the one hand, at the deflection plane and at the same time, at an interposed deviation line mirror 12 with a planar, reflecting surface 13 which, in turn, is oriented towards the spherically convex surface of the aplanatic unit lens.

In the scanning system described, an objective lens 14 and a dispersing lens 15 which, among other things, serve the yet to be described precorrection of the spherical aberration of the scanning system precede it in the path of rays outside of this system.

Starting from an intermediate image plane 16, onto which a picture element of a typographic character may be projected by conventional optical means, in particular a decollimator lens (not shown), the beam of rays travels through the dispersing lens 15 and the objective lens 14, the spherically convex surface 9 of the aplanatic lens and emerges from the latter's approximately planar surface as a beam of collimated light. The beam impinges the turnable, reflecting surface 2 of the polygon 1 and is reflected back into the aplanatic unit lens 7 in accordance with the momentary rotary position of the polygon in order to be projected ultimately in a controlled position 6a within the scanning line 6. By this process, the approximately planar surface 8 reduces the deflection angle of the polygon 1 required for the excursion of the position 6a in the scanning line relative to a reference point. This reduction occurs essentially due to refraction on the approximately planar surface 8. The beam of rays traveling through the aplanatic single lens, when it emerges at the latter's spherically convex surface 9, is then focused essentially in the position 6a in the scanning line, i.e. the other optical elements of the scanning system contribute to the focusing in a correcting way only. As already stated, the principal rays of the beam of rays impinge the spherically convex surface 9, thus representing an aplanatic surface, see e.g. the principal ray 17, as radial lines for all utilizable deflection angles.

The beam of rays emanating from the spherically convex surface 9 in the direction towards the image plane is reflected by the planar, reflecting surface 13 of the deviation line mirror 12 onto the spherical, reflecting surface 11 of the field flattening mirror 10 and focused by it completely in the position 6a in the scanning line. In so doing, the deviation line mirror separates the ray coming from the aplanatic single lens from the ray reflected by the field flattening mirror.

Aberrations of the field flattening mirror 10 can be compensated by counter-measures on the aplanatic single lens 7. This makes it possible to adhere to the beam condition.

In summary in an optical flat bed scanning system, in particular of a typesetter, an optic device to linearize deflection positions in a planar deflection plane is designed with essentially two elements. The deflection positions therein are determined by the deflection angle of a turnable or pivotable, reflecting surface (2). The linearizing optic device, disposed between the turnable or pivotable, reflecting surface and the deflection plane, comprising an aplanatic unit lens (7) adjacent to the said reflecting surface. This single lens is shaped to contain a first, approximately planar surface (8) facing the turnable or pivotable reflecting surface (2) and a second, spherically convex surface (9) facing the deflection or scanning plane (5) i.e., the light sensitive fiber plane. The form of the spherically convex surface (9) is such that the principal ray (17) of the beam of rays impinging it do so essentially as a radius of the curvature at all deflection angles. The linearizing optic device comprises further a field flattening mirror (10) near the deflection plane (5), which mirror is preferably designed with a spherical, reflecting surface (11).

What is claimed is:

1. In an opto mechanical deflector employed to focus a parallel light beam onto a flat image plane, the deflector being of the type comprising at least one rotating scan mirror onto which the light beam impinges, is reflected and focused onto a flat image plane by reflection off a concave mirror positioned in proximity to the flat image plane, the improvement wherein a lens having a flat surface and a convex curved surface is positioned in the path of light reflected from the rotating scan mirror, between the scan mirror and the concave mirror, with the flat surface thereof facing the scan mirror and the curved surface facing the concave mirror and of a curvature such that the flat surface refracts the beam impinging thereon in a manner such that the beam exiting the lens is substantially perpendicular to the curved surface, whereby for a given resolution and line length the angle of deflection of the scan mirror is increased and the optical lever to the image plane shortened.

2. A deflector according to claim 1, wherein the lens is positioned for being traversed twice by a beam of light.

3. A deflector according to claim 1 or 2, wherein at least one dispersive lens is positioned in the entrance ray path to the lens in the direction toward the rotating scan mirror for compensating for spherical aberration.

4. A deflector according to claim 1 or 3, wherein a plane mirror is mounted in the vicinity of the concave mirror, and wherein sag of the line in the image plane due to oblique impingement of the beam onto these two mirrors is compensated for by tilting of the rotating or slewing axis of the scanning mirror.

5. A deflector according to claim 4, wherein said image plane comprises a light sensitive light.

6. A deflector according to claim 5 wherein lens has a ratio of curvature radius of the curved surface to the plane surface of at least 5:1.

* * * * *